United States Patent [19]

Sano et al.

[11] Patent Number: 4,477,708
[45] Date of Patent: Oct. 16, 1984

[54] APPARATUS FOR PREHEATING THE ENDS OF UPSET STEEL PIPES

[75] Inventors: Shigeru Sano, Yokosuka; Katsumi Sakurai, Kawasaki; Tatsuo Ono, Yokohama; Kanji Tsuruoka, Kamakura; Masaru Watanabe, Yokohama, all of Japan

[73] Assignee: Nippon Kokan Kabushiki Kaisha, Tokyo, Japan

[21] Appl. No.: 398,812

[22] Filed: Jul. 16, 1982

[30] Foreign Application Priority Data

Jul. 24, 1981 [JP] Japan .................................. 56-115388

[51] Int. Cl.³ .............................................. H05B 6/40
[52] U.S. Cl. ............................... 219/10.67; 219/10.73; 219/10.75
[58] Field of Search ............... 219/10.57, 10.67, 10.69, 219/10.43, 10.73, 10.77, 10.79, 8.5

[56] References Cited

U.S. PATENT DOCUMENTS

| 3,505,492 | 4/1970 | Ross | 219/10.69 |
| 3,553,414 | 1/1971 | McArthur | 219/10.71 |
| 4,158,758 | 1/1979 | Kunioka et al. | 219/10.43 |
| 4,258,241 | 3/1981 | Soworowski | 219/10.71 |

Primary Examiner—C. L. Albritton
Assistant Examiner—M. M. Lateef
Attorney, Agent, or Firm—Michael N. Meller

[57] ABSTRACT

Both thickened end portions of predetermined lengths of an upset steel pipe are preheated simultaneously, in advance of heat treatment of the pipe, in an apparatus provided with means for raising or lowering the stationarily supported upset steel pipe and with a pair of induction heaters for simultaneously heating both end portions of the upset steel pipe in the raised position of the pipe, said pair of induction heaters being set in advance to a relative spacing corresponding to the length of said steel pipe, and reciprocated with strokes corresponding to the lengths of the thickened end portions. The support means for raising and lowering the pipe comprise a plurality of units which may be raised and lowered separately and selectively.

4 Claims, 3 Drawing Figures

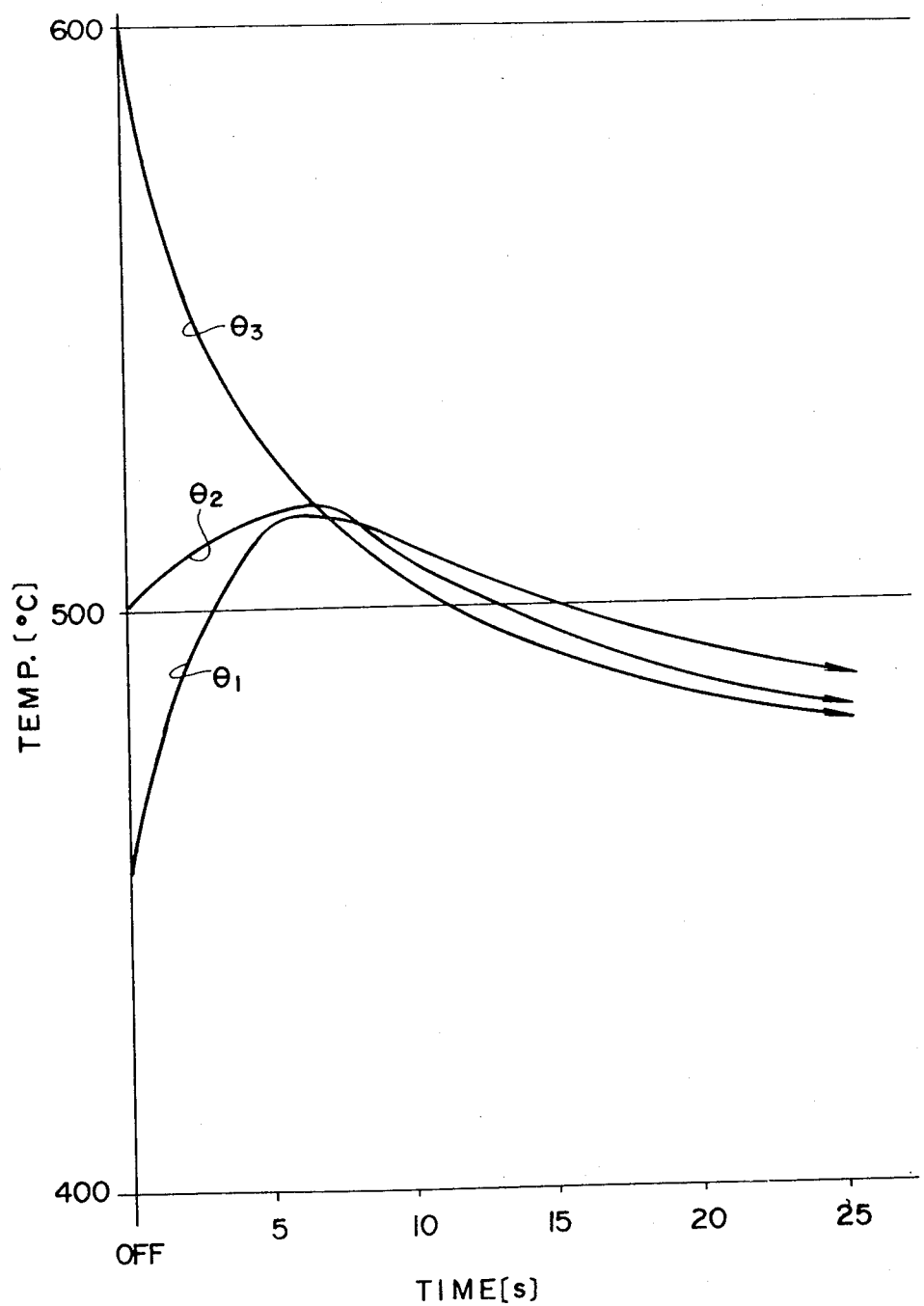

APPARATUS FOR PREHEATING THE ENDS OF UPSET STEEL PIPES

BACKGROUND OF THE INVENTION

This invention relates to an apparatus for preheating upset end portions of upset steel pipes in advance of quenching, tempering or the like heat treatment of the steel pipes.

The upset steel pipes are those steel pipes which are thicker over certain lengths at the pipe end portions than in the remaining main pipe portion and reserved for machining of screw couplings or the like couplings. When the upset steel pipe is subjected to heat treatment such as quenching or tempering for realizing targeted mechanical strength, more time is involved in elevating the temperature of the thickened upset end portions of the pipe because of the larger thickness of the pipe wall at these end portions, thus resulting in lowered operational efficiency. Particularly, since the effect of tempering of steel depends on the operating temperature and time, such difference in the heating of the main portion and upset portions is not desirable for realizing uniform mechanical properties throughout the length of the upset pipe. With this in view, various systems have been devised for preheating only the upset end portions of the upset steel pipe. According to a known system of this kind, in advance of heating the upset steel pipe in a quenching barrel type heating furnace while at the same time the steel pipe is transferred axially, preheating induction heating coils adapted for preheating the forward end portion of the pipe are arranged in the transverse feed line of the steel pipe. Then, preheating induction heating coils adapted for preheating the rear end portion of the pipe are arranged at a certain distance from the first preheating coils for affording a delay corresponding to a heating time delay between the forward and rear portions at the barrel-type furnace as determined by the pipe length and the feed speed. After the forward and rear upset portions are preheated by these coils with a certain relative delay, the steel pipe is transferred to the axial transfer line for heat treatment. According to another known system, while the upset steel pipe is transferred axially in front of a tunnel furnace, the preheating apparatus is moved simultaneously and in parallel with the pipe for preheating both upset pipe end portions.

However, these known systems suffer from the following deficiencies.

In the former system, since the upset steel pipe itself is moved axially between the preheating devices associated with the respective pipe ends, preheating can not be limited precisely to the targeted upset portions the upset only the upset but the remaining main portion of the pipe may be preheated, thus resulting in deteriorated product quality. Secondly, energy losses may be caused because both pipe ends are not heated simultaneously.

In the latter system, since the preheating device is moved simultaneously with the upset steel pipe in the axial direction of the pipe, the apparatus can not be positioned precisely in response to occasional changes in the pipe length and the main pipe portion may thus be heated in case of changes in the pipe length, equally resulting in deteriorated product quality. In addition, the length of the preheating sections can be changed only with considerable difficulties, when the length of the upset portions is changed.

SUMMARY OF THE INVENTION

This invention has been made for obviating the above deficiencies and has as an object to provide a preheating apparatus wherein the upset steel pipe is stationary and the induction heating coil is moved in an amount depending on the pipe length for precisely heating the portions of the pipe corresponding to the upset portions thereof, and wherein both ends of the upset steel pipe are heated simultaneously for avoiding useless heat radiation and minimizing energy losses.

The apparatus for preheating the ends of an upset steel pipe according to the present invention comprises support base blocks for vertically movably supporting the upset steel pipe received from transfer means, at least one pair of induction heating coils arranged above said support base blocks for simultaneously heating both ends of the upset steel pipe in the raised position of said support base blocks, a carriage movable for displacing at least one of said coils to a spacing corresponding to the length of the steel pipe, and means for axially moving said coils with variable strokes adjusted relative to the length of the upset portions of the upset steel pipe. The apparatus of the present invention is so designed that the upset end portions of the steel pipe are preheated to a mean temperature such that temperature fluctuations in the heat treatment furnace may be compensated despite the cooling effects the preheated pipe undergoes until it is charged into the heat treatment furnace.

BRIEF DESCRIPTION OF THE DRAWINGS

FIG. 3 is a diagram showing temperature changes with respect to time, such changes occurring when the current supply to an induction heating coil is interrupted at the outer surface temperature of 600° C. after the upset portions with an outside diameter of 103.5mm and wall thickness of 16.75mm have been heated by the coil energized with the current of the frequency equal to 500 Hz, wherein $\theta_1$ is the curve for inner surface temperature, $\theta_2$ the curve for temperature at the center of the wall thickness and $\theta_3$ the curve for outer surface temperature.

DESCRIPTION OF THE PREFERRED EMBODIMENT

Figure 1:
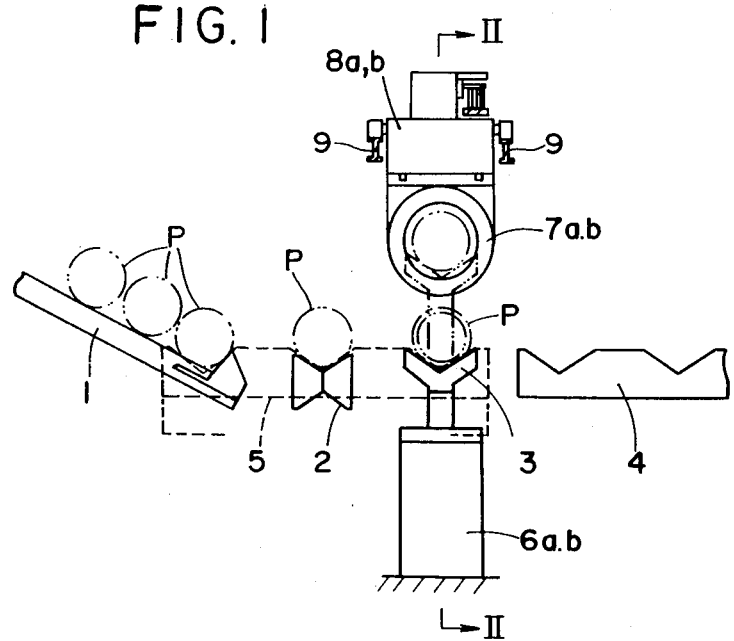
FIG. 1 is a side elevation showing schematically an embodiment of the present invention.
Figure 2:
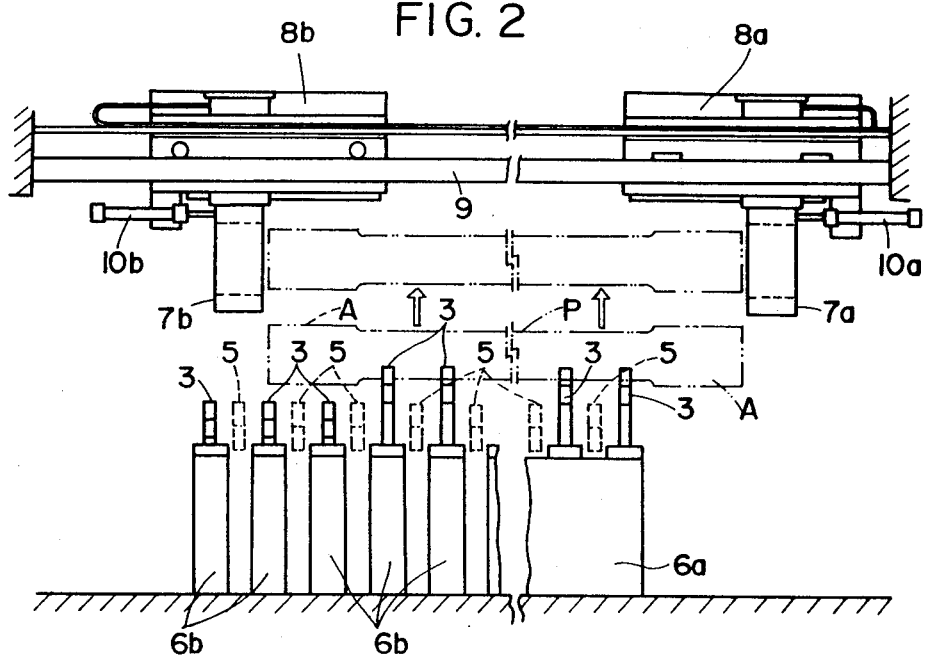
FIG. 2 is a view looking in the direction of the arrow mark (II—II) in FIG. 1.

In FIGS. 1 and 2, the numeral 1 denotes an input side table, the numeral 2 an alignment and length measuring line roll, the numeral 3 support base blocks, the numeral 4 an output side skid, and the numeral 5 walking beams for transversely guiding upset steel pipes P through these elements. The support base blocks 3 are designed to support the steel pipes P so as to be movable vertically between the transverse guide line level of the pipes P by the walking beams 5 and an upper level above said transverse guide line level. Each steel pipe P has its length measured on the alignment and length measuring line roll 2 with a preset pipe end (right-hand side end in FIG. 2) aligned to a preset reference position, and is shifted by the walking beams 5 transversely onto the support blocks 3, where the pipe is raised or lowered without shifting axially. A plurality of such support blocks 3 are mounted in a row axially of the steel pipes. Several support blocks 3 on the side of the reference end of the pipe P are associated with a common elevator 6a and raised or lowered thereby in unison. The remaining support blocks 3 are associated severally with separate elevators 6b so as to be raised or lowered separately. Depending on the length of the pipes P placed on the support blocks 3, the blocks 3 disposed beyond the end of the pipe opposite to its reference end (lefthand side blocks in FIG. 2) are kept at the lower level for preventing unloaded blocks 3 from interfering with steel pipe ends or with upper components such as induction heating coils. The numerals 7a, 7b denote a pair of such induction heating coils arranged above said base blocks 3 for simultaneously heating both upset ends of the steel pipe P at the upper level above the support blocks. When the steel pipes P are fed stepwise one by one by the walking beams 5 as shown in FIG. 1, only one pair of the heating coils 7a, 7b suffices for the aim in view. However, when several pipes P are fed transversely at a time for elevating the operating efficiency, the base blocks 3 must be provided in a plurality of rows and the same plurality of pairs of the induction heating blocks must be provided thereabove for providing a multiple processing apparatus or unit.

Referring to FIG. 2, the coil 7a towards the reference coil end is supported on a stationary pedestal 8a for movement axially, whereas the opposite coil 7b is also supported for movement axially on a carriage 8a mounted on an overhead rail 9. The coil 7b is moved by movement of the carriage 8b to an interval from the coil 7a corresponding to the pipe length as measured by said line roll 2.

The coils 7a, 7b are supported respectively by said pedestal 8a and the carriage 8b for movement axially, as mentioned above, and a pair of piston-cylinder units 10a, 10b are mounted to the pedestal 8a and the carriage 8b, respectively, for applying longitudinal feed strokes to the coils 7a, 7b corresponding to the lengths of the upset portions A of the upset steel pipe P. These strokes may be changed with changes in the length of the upset portions A.

In operation, the steel pipe P placed on the input side table 1 is transferred by the walking beams 5 onto the alignment and length measuring line roll 2. The length of the steel pipe is measured on the line roll 2, with the preset reference end of the steel pipe aligned with the reference position by fine axial displacement of the steel pipe caused by rotation of the line roll 2. The pipe is then shifted onto the support block 3 by operation of the walking beams 5. During this interval, the carriage 8b is moved on the basis of the measured length of the carriage 8b in such a manner that the coil 7b is placed at an interval from the coil 7a corresponding to the measured length of the steel pipe P. Then, the base blocks 3 are raised so that the pipe P is located in position between the coils 7a, 7b. The feed cylinders 10a, 10b are then actuated for feeding the coils 7a, 7b simultaneously towards the upset pipe end portions A. In this manner, the upset portions are preheated by induction heating so that no temperature differential is caused between the two pipe ends. When the pipe P is transferred onto the base blocks 3 following length measurement, the base blocks 3 on the opposite side and lying beyond the measured length of the pipe are rendered inoperative for the preheating and subsequent operations for the pipe by the selective operation of the elevators 6b. These base blocks are maintained preferably in the lower level.

In general, when the upset end portions are heated by the induction heating coils, the temperature changes with time following interruption of the heating current are not the same for the inside and outside of the steel pipe, depending on the frequency of the a.c. current supplied to the coil. The difference in temperature in the direction of the pipe thickness may be obviated only after a lapse of several to ten or more seconds, depending on the thickness of the upset portions. According to the present invention, the coils 7a, 7b are energized and controlled at a frequency and an energizing time interval adjusted as a function of the thickness of the upset portions and in consideration of the cooling of the pipe determined by such conditions as ambient temperatures or the time elapsed until the pipe is charged into a heating furnace for heat treatment of the next step. The preheating temperature for the upset portions is controlled through heating both ends simultaneously so that the mean temperature of the pipe may be constant throughout the length of the pipe when the pipe is heated in the next step.

According to the present invention, as mentioned above, by heating the upset portions of the pipe simultaneously, it is possible to control the preheating temperature depending on the heat radiation that is likely to occur during the time elapsed until the pipe is charged into the furnace of the subsequent step. Energy losses may also be reduced to a minimum. Moreover, small differences in the length of the pipe or upset portions may be promptly dealt with, while conflict with steel pipes or other apparatus may be prevented positively from occurring. In addition, preheating efficiency can be elevated as desired by the multiple processing system designed to keep pace with the integrated process including forming and heat treatment processes of the upset steel pipes.

What is claimed is:

1. An apparatus for preheating the ends of an upset steel pipe comprising support base blocks for vertically movably supporting the upset steel pipe, at least one pair of induction heating coils being arranged above said support base blocks for simultaneously heating both ends of the upset steel pipe in the raised position of said support base blocks, a carriage movable for displacing at least one of the coils to a spacing corresponding to the length of the steel pipe, and means for axially moving said induction heating coils with variable strokes adjusted relative to the length of the upset portions of the upset steel pipe wherein said support blocks may be raised and lowered separately and selectively.

2. The apparatus as claimed in claim 1 wherein a plurality of said support base blocks are arranged axially of the steel pipe in the support position thereof, a certain number of said support base blocks towards one end of said steel pipe being raised or lowered in unison by a common elevator and a certain number of said support blocks towards the other end being selectively and separately raised or lowered by separate elevators.

3. The apparatus as claimed in claim 1 wherein one of the induction heating coils is supported axially movably on a stationary pedestal and the other coil is supported axially movably on said carriage.

4. The apparatus as claimed in claim 1 wherein said means for moving the coils comprise piston and cylinder units.

* * * * *